United States Patent [19]

Campbell et al.

[11] Patent Number: 5,404,796
[45] Date of Patent: Apr. 11, 1995

[54] APPARATUS FOR PROVIDING FRENCH FRIED POTATOES

[76] Inventors: Colin K. Campbell, 6418 City W. Pkwy., Apt. 1315, Eden Prairie, Minn. 55344; Dennis C. Pomerleau, 19247 180th Ave., Big Lake, Minn. 55309; Robert F. Rasmussen, Rte. 3, Box 136S, Buffalo, Minn. 55313; Lawrence D. Pillar, 6827 Cardinal Cove Dr., Mound, Minn. 55309

[21] Appl. No.: 141,116

[22] Filed: Oct. 22, 1993

Related U.S. Application Data

[63] Continuation of Ser. No. 258,992, Oct. 17, 1988, Pat. No. 5,272,961.

[51] Int. Cl.⁶ .............................................. A47J 37/12
[52] U.S. Cl. .................................. 99/357; 99/353; 99/356; 99/407; 99/408
[58] Field of Search .................. 99/327, 328, 330, 353, 99/355, 403, 407, 408, 405, 357; 425/131.1, 132, 376.1, 382 R; 221/9, 15, 21, 30, 92, 93, 96, 97, 150 R, 150 A; 222/51, 64, 67, 80, 129.1, 129.2

[56] References Cited

U.S. PATENT DOCUMENTS

| | | | |
|---|---|---|---|
| 2,177,166 | 10/1939 | Bemis | 99/407 |
| 2,780,984 | 2/1957 | Kleeman | 99/408 |
| 2,893,609 | 7/1959 | Spiess, Jr. et al. | 222/361 |
| 3,027,258 | 3/1962 | Markakis | 426/540 |
| 3,055,286 | 9/1962 | Valente | 99/299 R |
| 3,109,739 | 11/1963 | Hilton | 426/550 |
| 3,163,546 | 12/1964 | Pader | 426/637 |
| 3,210,193 | 10/1965 | Martin | 99/408 |
| 3,399,062 | 8/1968 | Willard | 426/550 |
| 3,410,199 | 11/1968 | Quednau | 99/403 |
| 3,431,835 | 3/1969 | Angold | 99/408 |
| 3,448,677 | 6/1969 | Dexters | 99/407 |
| 3,451,822 | 6/1969 | Fast et al. | 99/353 |
| 3,539,356 | 11/1970 | Benson | 426/550 |
| 3,667,373 | 6/1972 | Sicher et al. | 99/407 |
| 3,690,247 | 9/1972 | Van Cleven et al. | 99/407 |
| 3,698,915 | 10/1972 | Glasgow | 426/550 |
| 3,708,256 | 1/1973 | Kopp | 425/376.1 |
| 3,726,149 | 4/1973 | Ilines | 100/293 |
| 3,749,373 | 7/1973 | Kemper | 366/76 |
| 3,827,344 | 8/1974 | Pratolongo | 99/407 |
| 3,892,511 | 7/1975 | Farrant | 425/464 |
| 3,925,563 | 12/1975 | Straughn et al. | 426/302 |
| 3,937,608 | 2/1976 | Farrant | 425/159 |
| 3,987,210 | 10/1976 | Cremer | 426/550 |
| 4,005,139 | 1/1977 | Kortschot et al. | 426/550 |
| 4,198,437 | 4/1980 | Citti et al. | 426/104 |
| 4,359,935 | 11/1982 | Murray | 99/407 |
| 4,438,683 | 3/1984 | Bartfield | 99/330 |
| 4,489,646 | 12/1984 | Schmidt et al. | 99/330 |
| 4,489,647 | 12/1984 | Stamps et al. | 99/407 |
| 4,502,372 | 3/1985 | Mariotti | 99/407 |
| 4,505,193 | 3/1985 | Mariotti | 99/330 |
| 4,505,194 | 3/1985 | Mariotti | 99/336 |
| 4,520,717 | 6/1985 | Bohrer et al. | 99/337 |
| 4,539,898 | 9/1985 | Bishop | 99/336 |
| 4,540,588 | 9/1985 | Bartfield | 426/231 |
| 4,646,627 | 3/1987 | Bartfield | 99/330 |
| 4,694,742 | 9/1987 | Dover | 99/404 |
| 4,694,743 | 9/1987 | Groff | 99/405 |
| 4,722,267 | 2/1988 | Galockin et al. | 99/407 |
| 4,733,803 | 3/1988 | Sisson et al. | 222/361 |
| 4,744,293 | 5/1988 | Shimokawa | 99/404 |
| 4,861,255 | 8/1989 | Ney | 425/376.1 |
| 4,901,886 | 2/1990 | Kirschner | 222/386.5 |
| 4,936,199 | 6/1990 | Ruggin et al. | 99/289 R |
| 4,971,223 | 11/1990 | Falavigna | 99/407 |

FOREIGN PATENT DOCUMENTS

| | | | |
|---|---|---|---|
| 2491031 | 4/1982 | France | 99/407 |
| 3438539 | 4/1986 | Germany | 99/289 R |
| 270118 | 5/1927 | United Kingdom | 99/449 |
| 639895 | 7/1950 | United Kingdom | 99/407 |

*Primary Examiner*—David A. Scherbel
*Assistant Examiner*—Reginald L. Alexander

[57] ABSTRACT

A vending machine for providing french fried potatoes from dehydrated powder. Powder is metered into a cylinder of a rotatable, multi-cylinder cylinder block. Water is added when the block is rotated to the next stop. After mixing and two ready stations, the dough is extruded into hot oil in a cooking chamber. The oil is filtered and is then replenished from a reservoir. The dry powder and rehydrating stations are refrigerated. The vending machine includes absorption and adsorption filters to scrub the air while cooking to decrease oil odors.

6 Claims, 6 Drawing Sheets

APPARATUS FOR PROVIDING FRENCH FRIED POTATOES

CROSS-REFERENCE TO RELATED APPLICATIONS

This application is a continuation of application 07/258,992 filed Oct. 17, 1988, issued as U.S. Pat. No. 5,272,961 on Dec. 28, 1993 by the same inventors.

BACKGROUND OF THE INVENTION

1. Field of the Invention

The present invention relates to a coin operated french fry vending machine for vending french fry potatoes. The machine processes a powdered potato mix into a rehydrated cooked french fried potato.

2. Description of the Related Art

French fried potatoes are very desirable food products which are consumed in huge quantities throughout the world. Their appeal, however, is greatly diminished if the product is not served hot and fresh. Merely reheating a previously cooked french fried potato will result in an unsavory product which is soggy. The consumers of french fried potato products demand consistent quality similar to that which is obtainable from commercial fast food restaurants wherein the french fries are freshly prepared for each order.

The vending machine industry provides a large selection of food stuffs which may be purchased without requiring an on duty attendant or cook at the location. The introduction of the microwave oven has made it possible to greatly expand the selection of vending machine products. However, french fried potatoes when reheated in a microwave oven lose their desired taste, texture and crispiness. A large untapped market exists for providing freshly prepared, hot french fried potatoes at vending machine outlets.

There are a great number of vending machines in operation today. They may be used anywhere from a truck stop to manufacturing plants where cooking facilities are not available on an around-the-clock basis. In order to be profitable the vending machine should require a minimum of care and must consistently offer the same high quality service to the patron. If the machine is labor intensive or is prone to breakdowns, the machine will not be profitable.

U.S. Pat. No. 4,722,267 which issued Feb. 2, 1988 to Galockin et al, shows a french fry food vending machine which has the plurality of frozen food stuff holding compartments in a refrigerated container. As shown, the machine dispenses four different types of food stuffs, each of which must be kept in a refrigerated state prior to cooking. This is a very distinctive drawback in that very few servings may be held in the machine at one time. This necessitates reloading of the machine at frequent intervals.

In Dover, U.S. Pat. No. 4,694,742 which issued Sep. 22, 1987, the inventor describes prior attempts to develop automatic deep fat cookers. Dover indicates that reconstituting dehydrated products into a dough prior to frying results in a product which is less tolerant to deviations in cooking parameters such as time and temperature. Dover notes that one of the recognized problems in fryer reconstituted products is that the cooking must be very closely controlled to minimize the amount of oil added to the product.

As anyone who has been in the fast food restaurant can attest to, the smell of hot oil can be a distinct disadvantage. Additionally, the hot oil itself must be very closely controlled for safety as well as for the quality control of the cooking.

SUMMARY OF THE INVENTION

The french fry vending machine of the invention includes a vending housing which holds a dry powder hopper, water supply connections, rehydration and potato strip forming chamber, cooking unit and filtration system.

Briefly, starting from the top of the machine down, there is a large potato mix hopper which holds the equivalent of about 700 individual vends of french fries. At the bottom of the hopper a potato powder shuttle meters a quantity of powder into a cylinder of a rotating cylinder block having five cylinders. The cylinder block rotates to the next position in which water is added and mixed. The cylinder block rotates two more positions to provide time for rehydration. At the last position the original cylinder is now in an extrusion position. A piston presses the now fully rehydrated product in the cylinder through an extrusion plate which shapes the dough into the desired french fry shape. The knife cuts the french fries from the extrusion plate allowing the uncooked potato strips to fall into the cooking unit.

Each vend activates the cylinder block which rotates one position. Fries are extruded from one cylinder while new product is added in another, rehydration in another and aging in the other two cylinders.

An upper door on the cooking chamber opens and the uncooked french fly strips are allowed to fall into the cooking chamber. The flies fall on top of a mesh net which is allowed to sag downwardly into the oil to allow cooking. During cooking all doors are closed so that the only openings to the cooking chamber are those which lead to a filtration system. The cooking chamber holds about 7 quarts of oil and is fed from a lower oil reservoir. The bottom of the cooking chamber is in communication with a unique crumb shuttle which cycles back and forth periodically to get rid of fried potato crumbs from the oil which otherwise would tend to build up from cooking new batches of fries. Crumbs would otherwise build up on the chamber bottom. If allowed to touch the heating element, the crumbs may burn creating objectionable odors and taste. The crumbs are passed from the crumb shuttle onto a replaceable filter above the oil reservoir.

During cooking, a fan pulls air from the cooker through a prefilter and then through an activated charcoal system. The air is then recirculated through the chamber.

After the potatoes have been in the hot oil long enough to be fully cooked, the mesh net is pulled back up out of the oil by a motor which includes a torque tender which flips the mesh to pop the fries loose and outward to direct them to a waiting cup. The cup is on a turntable which rotates to a position where a consumer can see and reach the product. The entire cycle takes less than one minute and after the first cycle is completed, the next closest cylinder also contains rehydrated mix potato product which is ready to extrude.

The apparatus of the invention provides high quality french fried potatoes within about one minute. The apparatus requires very little maintenance since it can dispense up to 700 times before additional supply of powder mix, cups and oil are required. The rehydration step is elegantly simple and provides a consistently uniform dough for extrusion. The design utilizes a minimum of room while allowing the necessary rehydration time needed to develop an acceptable product. The cooking region of the apparatus provides positive control over the french fries by insuring that all fries are removed at the end of each cycle. Any particulate matter generated is removed so that other vending cycles do not provide french fried potatoes coated with crumbs and grit from prior cycles. The entire system is enclosed such that oil carrying air is transported through filters to eliminate any cooking aroma which otherwise would be associated with the machine. The machine features are designed to minimize maintenance and to maximize the amount of time between refills and cleaning.

BRIEF DESCRIPTION OF THE DRAWINGS

A detailed description of one preferred embodiment of the invention is hereafter described, with specific reference being made to the drawings in which.

DESCRIPTION OF THE PREFERRED EMBODIMENTS

Figure 1:
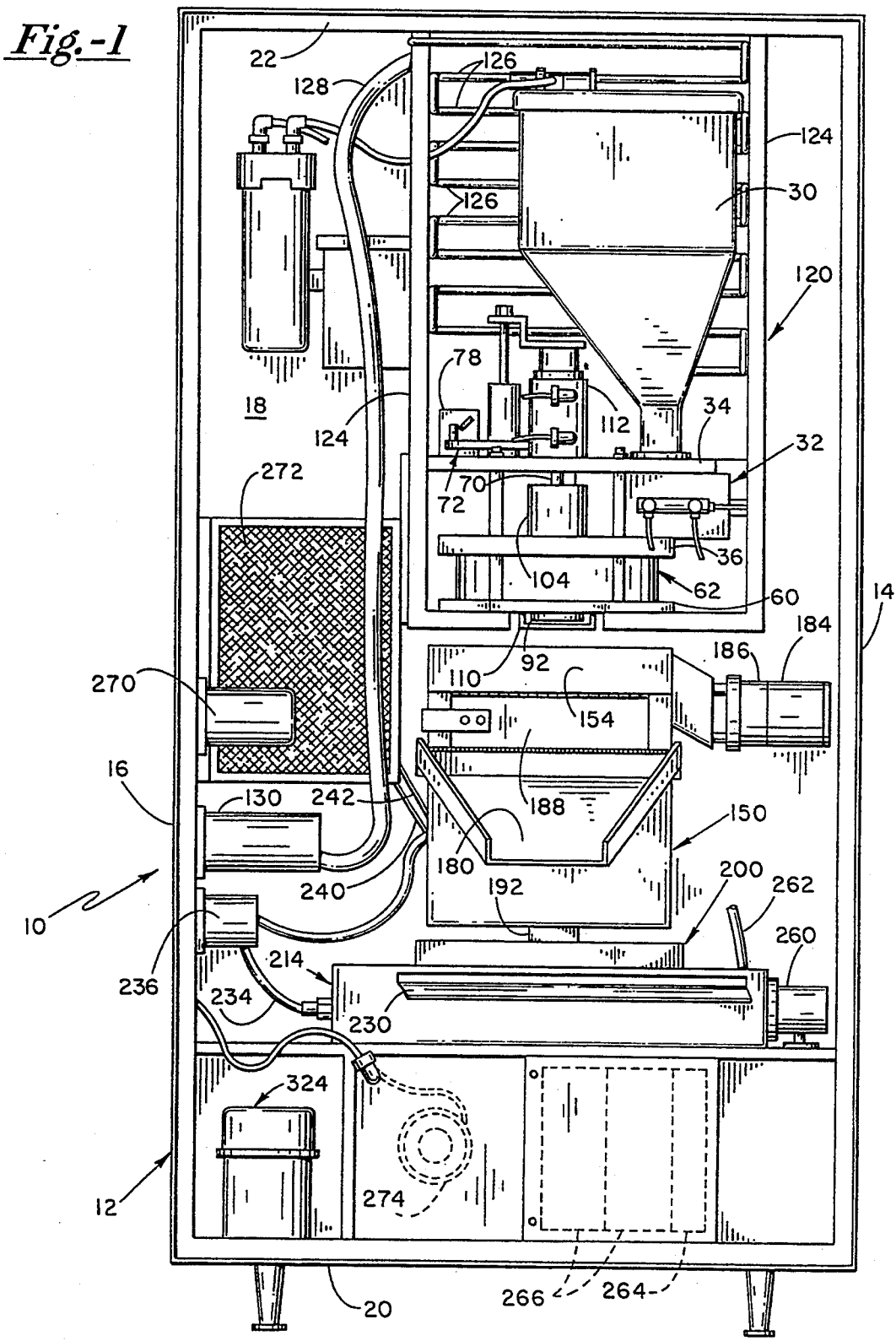
FIG. 1 is a front elevational view of the machine of the invention with the door removed to show the inner workings.

With reference to the drawings, FIG. 1 illustrates a french fry vending machine 10 in accordance with the teachings of the invention.

As shown, machine 10 includes a housing 12 which has a front panel (not shown), right side wall 14, left side wall 16, back wall 18, bottom wall 20 and top wall 22.

The front panel is a conventional door for vending units and includes push-button controls, coin box, coin return, and a see through door which may be opened when a cup full of fries is ready. When a vend credit is established, and the cooking process starts a flashing light over the door is energized during the cooking process. When the cup with an order of fries is in position for a customer to retrieve the light is de-energized. The door carries cup carrying mechanisms to dispense cups when needed.

Figure 2:
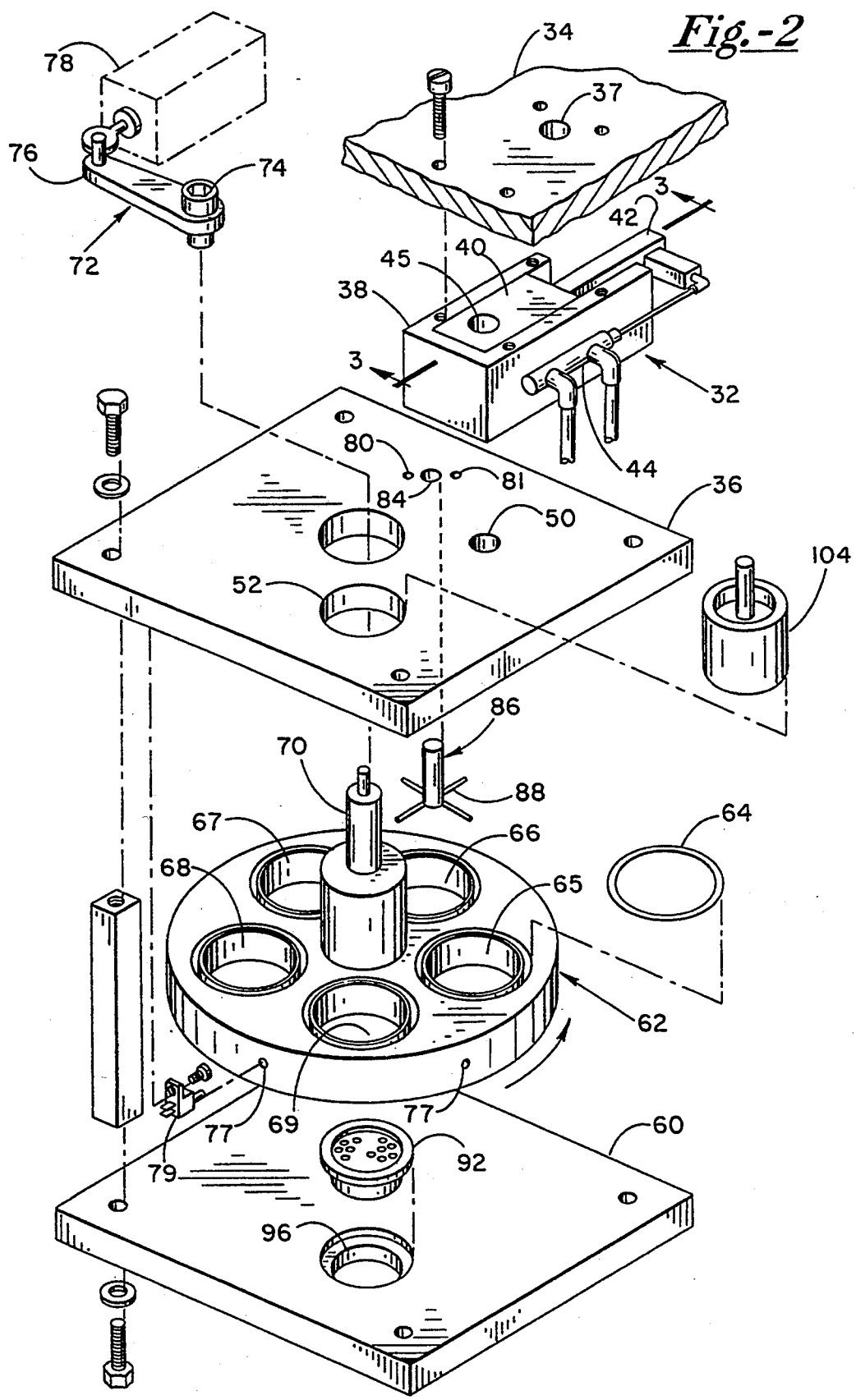
FIG. 2 is an exploded view of the rehydrating portion of the apparatus.
Figure 3:
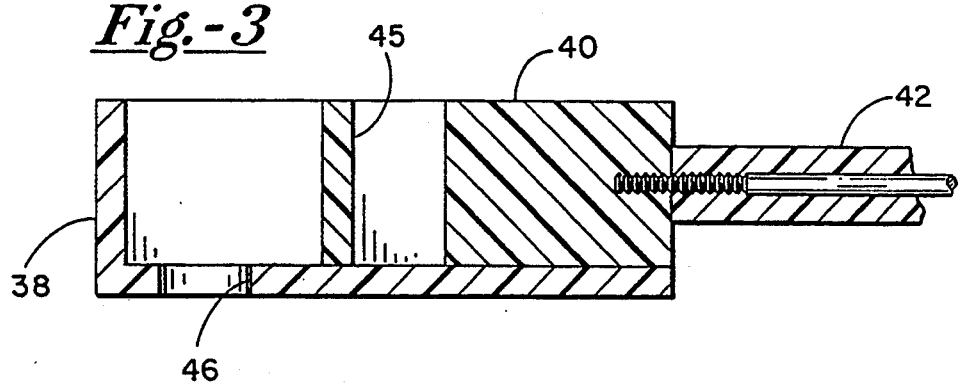
FIG. 3 is a sectional view taken along lines 3—3 of FIG. 2 through the powder shuttle.
Figure 4:
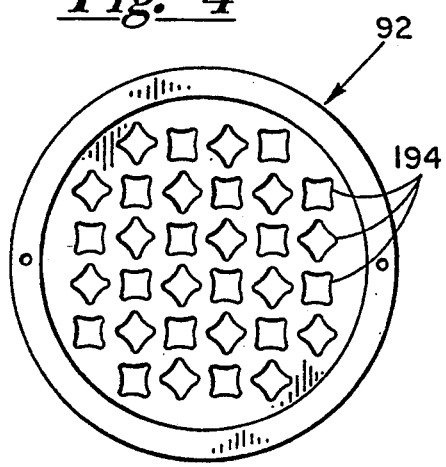
FIG. 4 is a top view of a suitable extrusion plate.

Starting from the top of the machine 10 and in order of the process, there is seen a large potato mix hopper which holds the equivalent of about 700 individual vends of french fried potatoes. At the bottom of the hopper 30 there is a powder shuttle 32 shown in greater detail in FIGS. 2 and 3. Powder shuttle 32 is mounted between plates 34 and 36. As shown, potato hopper 30 is positioned above plate 34 and its opening communicates through opening 37 in plate 34 to the powder shuttle 32. The powder shuttle 32 includes a housing 38 and a piston 40 attached to rod 42. Rod 42 is pushed and pulled by the action of pneumatic mechanism 44. Powder piston 40 includes an opening 45 and housing 38 includes an opening 46 there through as shown in FIG. 3. Plate 36 includes an opening 50 through which powder from the cavity defined by piston opening 45 may fall. As piston 40 is pulled out of housing 38 its opening 45 is in line with the powder hopper 30 through opening 37. The cavity in the piston is filled with powder for a single vend of french fried potatoes. When the piston moves back into housing 38 the powder falls through openings 46 and 50.

Sandwiched between plate 36 and lower plate 60 is a unique rotatable cylinder block 62. Cylinder block 62 preferably includes five cylinders marked 65, 66, 67, 68 and 69. Block 62 is rotatably mounted between plates 36 and 60, with an axle 70 projecting through plate 36 to engage with rachet member 72. Rachel member 72 has a ramping bearing 74. Pneumatic mechanism 78 pulls on arm 76 to rotate cylinder block 62 such that each cylinder advances to the position formerly held by the previous cylinder. Cylinder block 62 also includes several spaced index holes 77 as shown in FIG. 2. A microswitch 79 depending from plate 36 actuates each time its plunger enters an index hole 77 when the cylinder block rotates. The signal from switch 79 is then usable to direct mechanism 78 on how far to rotate the cylinder block 62.

As shown in FIG. 2, powder from hopper 30 would pass through powder shuttle 32 and descend via opening 50 into cylinder 65. The cylinder block would then index over one position, to that shown as cylinder 66. At that position, rehydration and mixing of the potato powder into dough takes place. Plate 36 includes perforations through which water injectors 80, 81 are mounted. Water is injected into a powder-charged cylinder in response to an electric water pump. The quantity of water is controlled by timing the pump. Plate 36 is also formed to include a recess 82 partially there through and an opening 84 which passes completely through plate 36. A mixing mechanism 86 passes downwardly through opening 84 and includes a cross-shaped paddle 88 which as shown has four blades pitched at a 45° deflection. A pneumatic cylinder 90 causes mixing mechanism 86 to descend downwardly out of recess 82 into the underlying cylinder. Mechanism 86 is then turned 180° and bounces back 180° by pneumatic rotary actuator 91. This is performed every 0.3 seconds for a total of about 4 seconds which thoroughly mixes the powder and water in the cylinder.

Preferably, the cylinder block 62 includes two cylinders which act as waiting stations where rehydration takes place. As shown, the positions held by cylinders 67 and 68 act as wait stations. No other activity happens at these stations, other than aging in which the water is fully wicked into the powder.

At the location held by cylinder 69 in FIG. 2, the rehydrated powder is extruded out of the cylinder through on extrusion plate 92 which has a plurality of spaced apertures 94. A suitable extrusion plate is described in U.S. Pat. No. 3,645,748 to lines. Extrusion plate 92 is held in an opening 96 in plate 60. Fries 100 are cut from extrusion plate 92 by a knife mechanism 106 after being forced through the die by an extrusion piston 104. Knife mechanism 106 includes a wire knife 108 slidably mounted to a track 110 which may be drawn back and forth by a motor. Piston 104 is driven by a pneumatic mechanism 112. In FIG. 1, Piston 104 is shown above opening 52 in plate 36. Mechanism 112 pushes piston 104 through opening 52 and through a cylinder lined up with extrusion plate 92 to force rehydrated potato through openings 94.

As shown is FIG. 1, all of the components described above with the exception of the underside of plate 60 immediately adjacent to the knife mechanism are enclosed within a refrigerator 120. Refrigerator 120 includes an insulated box 124 and refrigerator coils 126. The refrigerator keeps the powder and dough at about 45° F. controlling humidity and limiting growth of microorganisms. The low humidity created minimizes problems otherwise encountered with dispensing the powder. The refrigeration unit would require conventional lines 128 and a compressor 130.

Plates 36, 60 and cylinder block 62 are preferably formed from aluminum which has been coated with a Food and Drug Administration acceptable coating such as Ironstone®, Nylfluor®or Nickel. The pistons, powder shuttle, extrusion plate and rehydration mixer are preferably formed from acetyl copolymers such as Delrin® from E. I. Dupont Nemours and Company of Wilmington, Del. Cylinder block 62 may include o-ring seals 64 at the tops and bottoms of the cylinders which contact plates 36 and 60.

Figure 5:
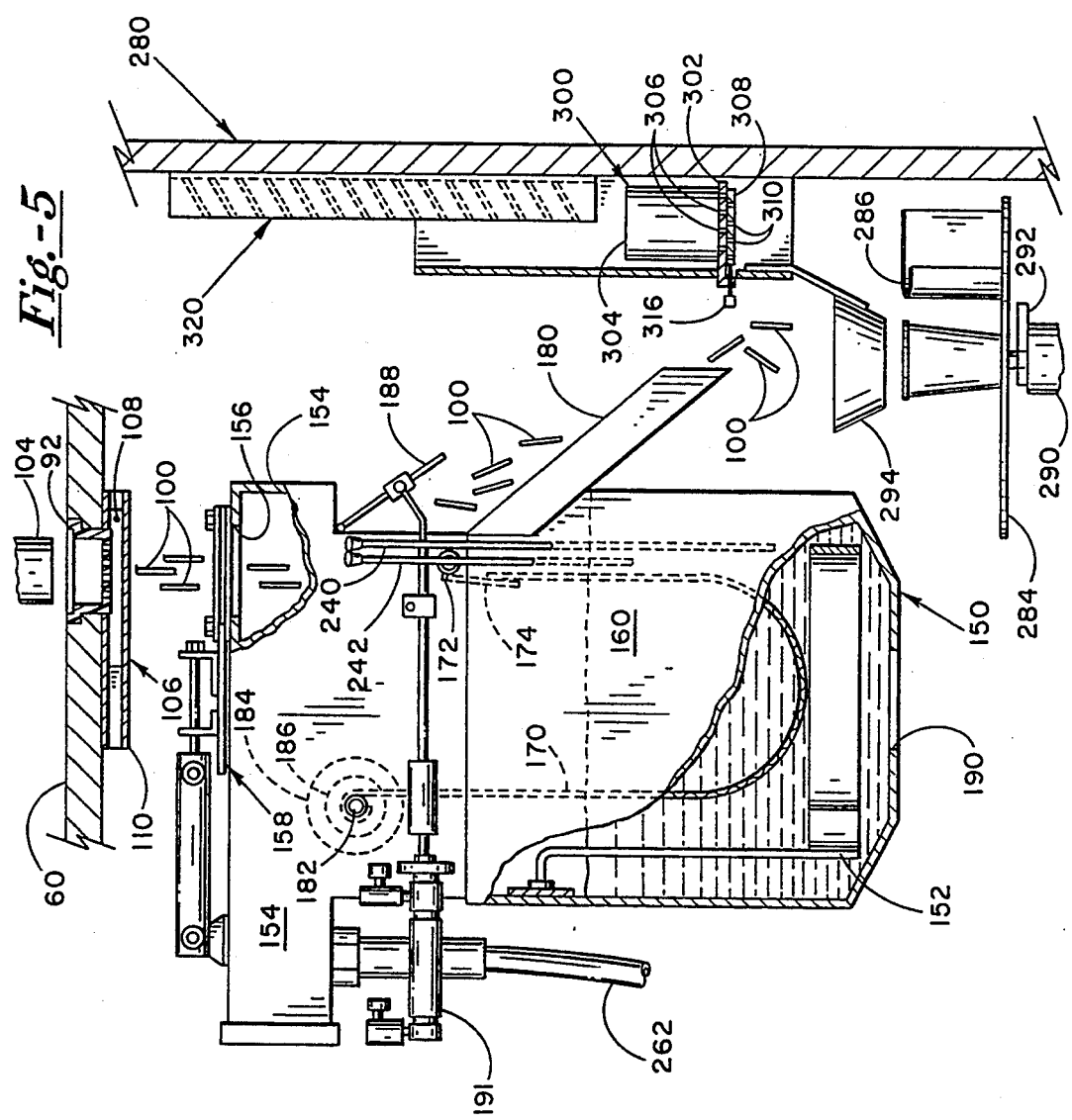
FIG. 5 is a side view with parts broken away of the cooking chamber and portions of the door mechanisms of the invention.

After being cut, fries 100 fall downwardly toward cooking chamber 150. Cooking chamber 150 as shown in FIG. 5 includes a tapered pot which holds about 7 quarts of oil. The chamber 150 includes a heating element 152 such as the elements available from Watlow Industries, Inc. of St. Louis, Mo. A 3000 watt element is suitable for a 7 quart chamber.

A head region 154 above chamber 150 encloses the chamber to control movement of hot oil during cooking. Fries 100 pass into chamber 150 via an opening 156 normally closed by sliding door mechanism 158. Door 158 is opened only during the extrusion/cutting of the fries.

Fries 100 fall into the oil 160 in the chamber and are held above a mesh net 170, preferably a stainless steel net extending across the full width of the chamber. Net 170 is attached along one edge to a fixed rod 172. Preferably, a flap of smooth stainless steel 174 is attached between net 170 and rod 172 which allows the fries to slide more easily onto chute 180. The opposing edge of net 170 is attached to a spindle 182 which is rotated by a reversible motor 184. Motor 184 may be an induction motor turning at about 50 rpm. Motor 184 allows the mesh net to go down into the hot oil to provide space for the fries to cook. After cooking, the mesh net 170 is reeled back into spindle 182 by motor 184. A torque tender 186 between spindle 182 and motor 184 which acts like a dog clutch and slips the mesh net. The motor in combination with the torque tender, causes fries on the net 170 to flip up and outwardly toward chute 180. Any fries which are stuck to mesh net 170 are released by the flipping action so imparted. Torque tenders are described in U.S. Pat. Nos. 3,124,227; 3,147,834 and 3,301,362. When the fries are cooked and flipped by the torque tender and motor, door 188 is opened by door mechanism 191. Fries are then channeled down on chute 180 to an awaiting cup positioned by the door mechanism of housing 12.

A portion of the door 280 is shown in FIG. 5. The door 280 includes an opening through which the customers may reach a cup 282 filled with fresh, hot french fries. Cups 282 are supplied from a conventional, but very large cup dispenser(not shown) to a turntable 284. Turntable 284 includes a cup positioner 286 which aids in positioning the cup and prevents a consumer from reaching further into the machine. Turntable 284 is rotated by a locking motor 290 and associated gear box 292. The motor 290 locks at each position so the cup is not able to rotate until the motor is energized. Fries from chute 180 fall through frustum shaped guide 294 to a cup on the turntable 284.

Door 280 also preferably includes a salting mechanism 300 which may apply salt to the fries as they pass from chute 180 towards cup 282. Mechanism 300 includes a support member 302 attached to door 280 and on which salt container 304 rests. Container 304 includes a bottom opening which feeds to perforations 306 in support member 302. A lower member 308 is in sliding engagement with member 302 as shown. Lower member 308 has perforations 310 which are normally staggered from perforations 306. However, when solenoid 316 is actuated, it slides lower member 308 into a position in which the perforations are aligned, allowing salt to flow out of container 304. The spring of the solenoid 316 returns the lower member 308 into a no salt flow position. The door may thus include selection buttons in which a customer may call for no salt- in which case the solenoid is never energized, normal salt- in which the solenoid is energized twice, or heavy salt- in which the solenoid may be actuated more frequently to provide more salt. In this manner, a customer can select the degree of salting desired. The salt is applied to the fries much more uniformly than by simply sprinkling salt from a shaker on to the top of the fries as is done by hand.

The door may also include a ketchup dispenser 320 in which packets of ketchup may be dispensed in response to depression of another user operated button. Ketchup packets may be dispensed from a simple dispenser of the type commonly used to dispense matchbooks. Such matchbook dispensers are available from many sources including Automatic Products Co. of St. Paul, Minn.

Figure 6:
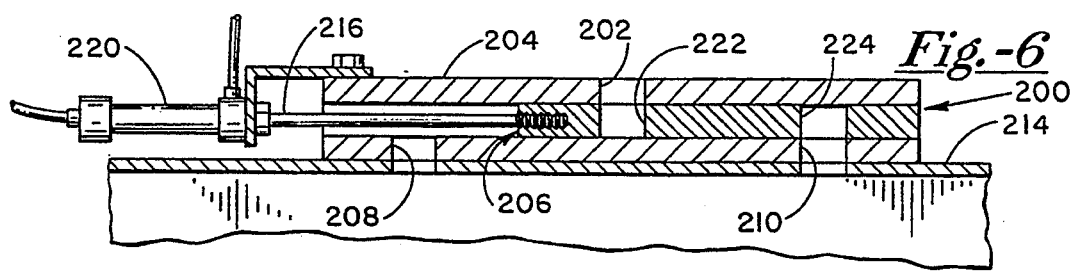
FIG. 6 is a sectional view through the crumb shuttle of the invention.
Figure 7:
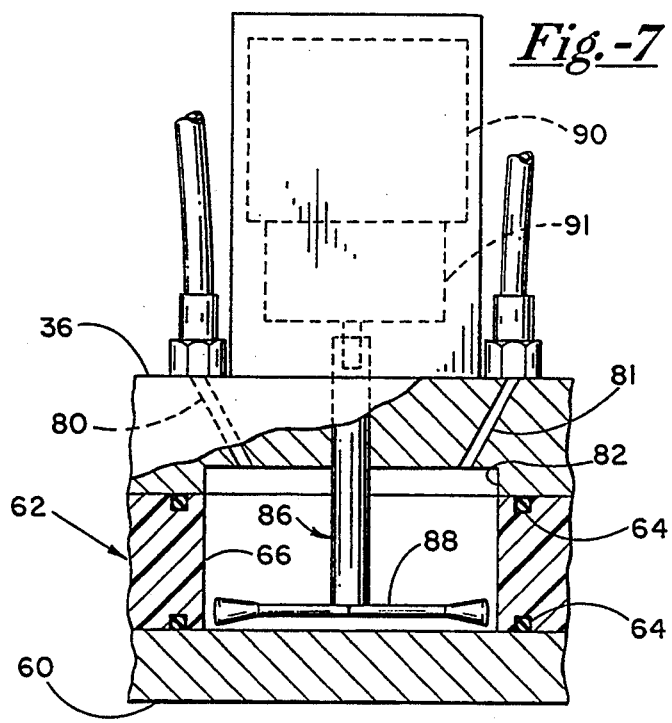
FIG. 7 is a sectional view of the mix mechanism of the invention.
Figure 8:
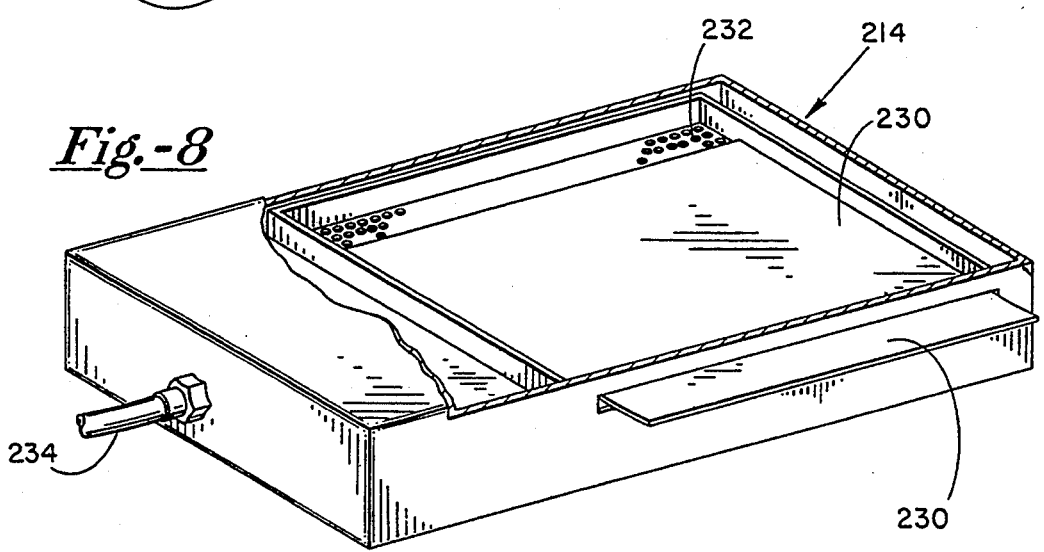
FIG. 8 is a perspective view of the oil reservoir and filters.
Figure 9:
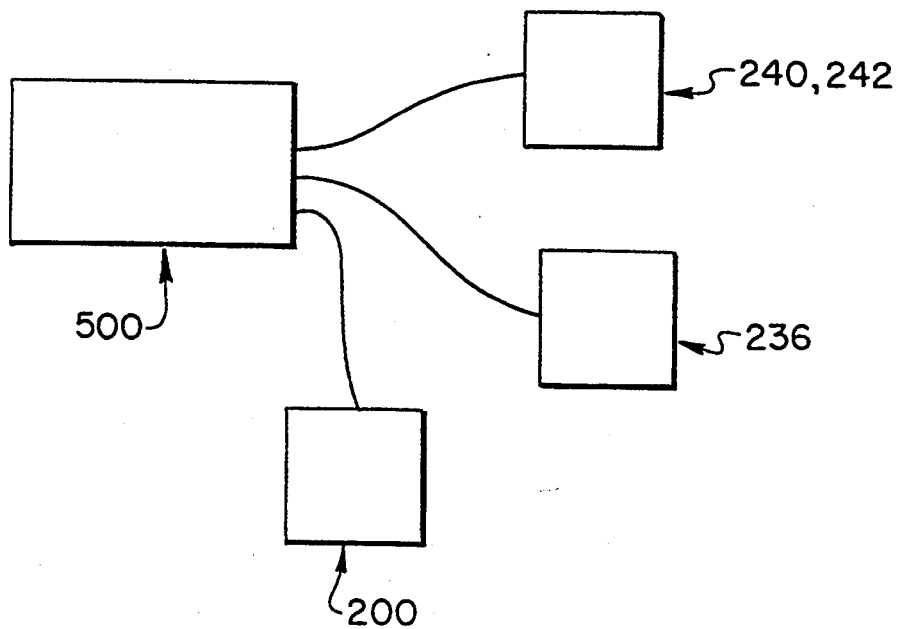
FIG. 9 is a schematic showing a programmable controller which directs the thermocouples and oil pump.

With reference to FIGS. 1, 5 and 6, it will be seen that cooking chamber 150 has a bottom opening 190 which leads via pipe 192 to a crumb shuttle 200. Crumb shuttle 200 provides a tail safe mechanism for removing fried potato grit and "crumbs" from the cooking oil in chamber 150. As fries are cooked, small particles tend to be formed or are dislodged by mesh net 170. After cooking, they become brown and hard and would be very undesirable if allowed to attach themselves to the next batch of fries to be cooked. Therefore, the bottom of chamber 150 is tapered to feed crumbs to opening 202 in the crumb shuttle.

Crumb shuttle 200 includes a stainless steel block 204 through which a bore is formed through which a shuttle piston 206 may slide. Block 204 also includes two spaced openings 208, 210 which communicate with a lower oil reservoir 214. A piston rod 216 is attached to an pneumatic mechanism 220 and to piston 206 as shown.

Piston 206 includes a pair of spaced piston openings 222, 224 there through which are spaced such that when one piston opening is aligned with opening 202, the other opening is aligned with a lower opening 208, 210. In this manner, about one ounce of oil containing crumbs and grit may pass from chamber 150 into a piston opening. As the piston reciprocates back and forth, the piston opening charged with oil and crumbs is aligned with a lower opening 208, 210, which allows the oil, crumbs and grit to drain out onto a paper filter 230 atop a paper filter carrying screen 232 above the oil level in reservoir 214.

The unique crumb shuttle design is fail-safe since there can never be a direct passageway between oil in chamber 150 and reservoir 214. As crumbs build up on paper filter 230, an operator merely needs to remove the filter and replace it. As shown, screen 232 is a slidable tray which may be pulled out from the reservoir to replace filter 230.

Lower reservoir 214 functions as an reservoir of clean, filtered oil to replenish chamber 150 for oil lost during the crumb shuttle action and for oil consumed by the cooking process or the french fried potatoes. Oil is pumped from reservoir 214 to chamber 150 via tubing 234 by oil pump 236, which may be an electric vibrating plunger pump.

The crumb shuttle is utilized after approximately 5 cycles of the machine to remove grit build-up. That loss, along with the loss of oil during cooking from the chamber requires periodic additions of oil from reservoir 214. A pair of thermocouples 240, 242 are positioned in the cooking chamber to monitor temperature and oil level. Thermocouple 240 provides temperature readouts which may be interpreted by a programmable controller 500 which in turn energizes or de-energizes the heating element 152. Additionally thermocouple 240 provides a base reference point which is compared to the readings obtained from thermocouple 242 which is spaced from thermocouple 240. The temperature spread between the thermocouples provides an accurate means for determining oil level in the chamber. When the oil level drops, thermocouple 242 becomes uncovered, and reads a cooler temperature than thermocouple 240. In response, oil is added to the chamber. A programmable controller 500 may be utilized to direct heating of the oil. If the machine is not to be in service for certain time periods, the oil is allowed to cool to about 120° F.

Machine 10 includes air filtration mechanisms to minimize any oil or cooking odors perceivable to customers. Immediately before door 158 opens, fan 260 is switched on pulling air from head region 154 above chamber 150 through hose 262 to an absorption prefilter 264 which removes moisture from the air and then through a full activated charcoal weave filter 266 which absorbs oil and other cooking odors. Filter 266 is available from Quality Filters, Inc. of Gulf Shores, Ala. as their double pleat, carbon impregnated filters rated for about 1000-1250 CFM. Fan 260 runs until fries are vended. It also functions to keep the lower side of plate 60 cooler, reducing the demand in the refrigeration unit.

Whenever the machine has power, fan 270 is on, pulling air from the inside of housing 12 out through activated carbon filter 272. An additional fan 274 is also on whenever the machine has power. Fan 274 is preferably a double squirrel cage fan and pulls air from inside the housing 12 through prefilter 264 and filter 266. In this manner, 100% of the air in the housing is scrubbed to remove moisture created during cooking and oil and other cooking-related odors.

The pneumatic controls of the invention are supplied with air from air compressor 324. A programmable controller 500 may be utilized to provide the desired timing intervals for cooking, salting, turntable control and cylinder block rotation. Likewise, the controller may direct oil temperatures and monitor warning and safety devices for fire protection, exhaustion of supplies, oil temperature or level faults and the like.

OPERATION

In practice, a consumer inserts coins into a standard coin mechanism to start the cycle. Lights are actuated to show the customer that the machine is processing the order. Previously, an operator has initially set up the machine with supplies and cycled the machine five times. Thus, cylinders 67, 68 and 69 are already filled with rehydrated potatoes. Piston 104 descends causing fries to extrude and fall into the hot oil. During cooking, the cylinders rotate one position with cylinder 68 being positioned to extrude at the next order. Simultaneously, the other cylinders have processing steps taking place. Each vend cycle only takes about one minute since the wait position cylinders provide full rehydration by the time the next order is made. Even if the potato mix requires a two minute rehydration, the cylinder arrangement provides only a one minute wait before the order is filled.

After the fries are cooked they are ejected out onto the churn and fall through the guide to a cup which has been rotated to the proper position. Depending on the customers selection, salt may be added as the fries pass through the guide. Additionally, ketchup in packets may be dispensed. The turntable then rotates to a position in which the customer may access the filled cup through the door. The machine by this time is ready for another vend of freshly prepared, hot french fries.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for vending fried potato strips in predetermined portion sizes in a discardable container from a rehydrated potato product, said apparatus comprising:
   (a) dehydrated potato mix hopper means for storing dehydrated potato mix, said hopper means having an inlet and an outlet;
   (b) rehydrating means;
   (c) shuttle means interposed between said hopper means and said rehydrating means for transferring a predetermined amount of potato mix from said hopper means to said rehydrating means;
   (d) water supply means;
   (e) said rehydrating means comprising means for rehydrating potato mix into a shapable dough and for extruding said dough into a plurality of potato strips and including a cylinder block defining at least three cylinders, extruding means for extruding dough as potato strips through one of said cylinders, means for adding rehydrating water from said water supply means to one of said cylinders, means for rotating said cylinder block to move each cylinder to discrete sequential locations in which either potato mix is added by said shuttle means, rehydrated with water from said water supply means, stored or extruded as said potato strips through said extruding means;

(f) cutting means for cutting said extruded potato strips;

(g) cooking means for receiving extruded potato strips from said cutting means and for cooking said cut potato strips and discharging the cooked cut potato strips; and (h) dispensing means including a supply of discardable containers for receiving the discharged potato strips, transferring the received potato strips into one of said discardable containers and providing access to said containers when filled with the cooked potato strip, wherein said rehydrating means, said hopper means and said shuttle means are substantially enclosed by a refrigeration means, said refrigeration means including a refrigeration chamber enclosing said hopper means and shuttle means and said rehydrating means but not said cutting means.

2. The apparatus of claim 1 wherein said cooking means includes a cooking chamber, an oil reservoir, a pair of spaced thermocouple connected to said chamber and extending within said chamber at respective levels and providing outputs in response to oil at those levels, and control means for controlling oil level in said cooking chamber in response to the outputs from said pair of spaced thermocouple, differences in said outputs indicating either high or low level, and a pump for pumping oil between said cooking chamber and said oil reservoir and being in fluid communication with said cooking chamber and said oil reservoir, said pump delivering oil to and from said chamber in response to said differences.

3. The apparatus of claim 1 wherein said cooking means includes a cooking chamber having a bottom opening and a crumb shuttle means attached below and in fluid communication with said bottom opening, said crumb shuttle means including an oil reservoir, said crumb shuttle means further including an upper plate having a single bore communicating with said bottom opening in said cooking chamber and having a reciprocating shuttle member disposed below said upper plate, said shuttle member having at least two shuttle member openings defined therethrough to be selectively alignable with said bore to allow crumbs from said cooking chamber to fall through said bore, said crumb shuttle means further including a lower portion disposed below said shuttle member and having at least two lower portion openings defined therethrough, said lower portion openings being vertically misaligned with said single bore to preclude said single bore from being in direct fluid communication with said lower portion openings irrespective of the position of said shuttle member, wherein said shuttle member openings are spaced by a first distance and said second lower portion openings are spaced by a second distance different from said first distance permitting each shuttle member opening to be aligned with a respective lower member opening when the other shuttle member opening is aligned with said single bore, said lower portion openings communicating with said oil reservoir, said device further including means for reciprocating said crumb shuttle.

4. The operator of claim 3 wherein said cooking means further includes a removable filter means situated between said oil reservoir and the lower portion crumb shuttle openings to receive and filter out crumbs from said oil in said chamber and reservoir.

5. The apparatus of claim 1 further including means for supplying ketchup packets to said dispensing means.

6. In an apparatus for vending fried potato strips in predetermined portion sizes from a rehydrated potato product, said apparatus including a rehydrating section, an extruding section, and a cooking unit including a cooking chamber, the improvement comprising:

(a) crumb shuttle means in fluid communication with the bottom of said cooking chamber, said crumb shuttle means including a single bore communicating with the bottom of the cooking chamber and a reciprocating shuttle member having at least one opening there through which is alignable with said bore during which time crumbs from said cook chamber may fall therewithin, said means further including a lower portion below said shuttle member which has at least one opening defined there through, said lower portion openings being arranged such that said bore may not be aligned with said lower portion openings, said lower portion openings communicating with an oil reservoir which supplies oil to the cooking chamber.

* * * * *